United States Patent
Nuutinen et al.

(10) Patent No.: US 8,605,688 B2
(45) Date of Patent: Dec. 10, 2013

(54) METHOD, APPARATUS, ANALYSER AND COMPUTER PROGRAM OF SEARCHING FOR PROPAGATION PATHS

(75) Inventors: Jukka-Pekka Nuutinen, Martinniemi (FI); Janne Kolu, Oulu (FI)

(73) Assignee: Elektrobit System Test Oy, Oulunsalo (FI)

( * ) Notice: Subject to any disclaimer, the term of this patent is extended or adjusted under 35 U.S.C. 154(b) by 1333 days.

(21) Appl. No.: 12/097,956

(22) PCT Filed: Dec. 28, 2005

(86) PCT No.: PCT/FI2005/050490
§ 371 (c)(1),
(2), (4) Date: Sep. 29, 2008

(87) PCT Pub. No.: WO2007/080209
PCT Pub. Date: Jul. 19, 2007

(65) Prior Publication Data
US 2009/0116456 A1 May 7, 2009

(51) Int. Cl.
*H04B 7/216* (2006.01)
(52) U.S. Cl.
USPC .......................................... 370/335; 702/57
(58) Field of Classification Search
None
See application file for complete search history.

(56) References Cited

U.S. PATENT DOCUMENTS

| | | | |
|---|---|---|---|
| 6,301,315 B1* | 10/2001 | Li | 375/346 |
| 6,466,629 B1 | 10/2002 | Isaksson et al. | |
| 6,961,397 B2* | 11/2005 | Ahmed et al. | 375/354 |
| 7,035,245 B2* | 4/2006 | Orr et al. | 370/342 |
| 7,088,978 B2* | 8/2006 | Hui et al. | 455/296 |

(Continued)

FOREIGN PATENT DOCUMENTS

| | | |
|---|---|---|
| EP | 1065801 A1 | 1/2001 |
| JP | 200226768 A | 1/2002 |

(Continued)

OTHER PUBLICATIONS

Translation of Japanese Official Action for Japanese application corresponding to U.S. Appl. No. 12/097,956, pp. 1-2.

(Continued)

*Primary Examiner* — Kevin C Harper
*Assistant Examiner* — Samina Choudhry
(74) *Attorney, Agent, or Firm* — Hoffmann & Baron, LLP

(57) ABSTRACT

A radio channel is formed for estimation, the radio channel including dominant paths from a digital impulse response estimate of a channel relating to a radio system. A divider divides the impulse response estimate temporally into at least two subsignals. An analyzer determines whether a distribution of the amplitude values of at least one subsignal is gaussian or non-gaussian. A searcher searches for a highest amplitude value in each subsignal, which is determined to be non-gaussian. A generator may form a radio channel for a radio channel simulation, the radio channel including each propagation path corresponding to the highest amplitude value in each subsignal determined to be non-gaussian.

31 Claims, 3 Drawing Sheets

(56) References Cited

U.S. PATENT DOCUMENTS

| | | |
|---|---|---|
| 2001/0046221 A1 | 11/2001 | Ostman et al. |
| 2002/0042279 A1* | 4/2002 | Da Rocha et al. ............ 455/456 |
| 2003/0182664 A1 | 9/2003 | Lusky et al. |
| 2004/0028124 A1* | 2/2004 | Nuutinen et al. ............. 375/227 |
| 2004/0093294 A1* | 5/2004 | Trevino .......................... 705/36 |
| 2004/0198296 A1 | 10/2004 | Hui et al. |
| 2004/0264561 A1 | 12/2004 | Alexander et al. |
| 2005/0267715 A1 | 12/2005 | Kolu et al. |

FOREIGN PATENT DOCUMENTS

| | | |
|---|---|---|
| JP | 2002290344 A | 10/2002 |
| JP | 2003-516060 A | 5/2003 |
| JP | 20040356901 A | 12/2004 |
| JP | 2005260315 A | 9/2005 |
| WO | WO0141482 A1 | 6/2001 |
| WO | WO03047132 | 6/2003 |
| WO | WO2006027607 | 3/2006 |

OTHER PUBLICATIONS

Zhan Zhang, et al., "Blind Receiver Scheme for Spatial Multiplexing over MIMO-FIR Channels", Vehicular Technology Conference, 2004. VTC2004-Fall. 2004 IEEE 60th Los Angeles, CA, USA Sep. 26-29, 2004, Piscataway, NJ, USA, IEEE.

Edwin van der Pol, Supplementary European Search Report for corresponding European Patent Application No. EP05822092, p. 1-2, Jul. 10, 2012.

Dominic Lam, Canadian Office Action issued in corresponding Canadian Application No. 2,633,060, pp. 1-4 (Aug. 9, 2012).

* cited by examiner

METHOD, APPARATUS, ANALYSER AND COMPUTER PROGRAM OF SEARCHING FOR PROPAGATION PATHS

CROSS-REFERENCE TO RELATED APPLICATION

This application is a National Phase application of International Application No. PCT/FI2005/050490 filed Dec. 28, 2005, which is incorporated herein by reference.

BACKGROUND OF THE INVENTION

1. Field of the Invention

The invention relates to simulation of a radio channel, particularly a radio channel of a CDMA radio system.

2. Description of the Related Art

When a radio frequency signal is transmitted from a transmitter to a receiver, the signal propagates in a radio channel along one or more paths having different signal phases and amplitudes, which causes fadings of different duration and strength in the signal. In addition, noise and interference caused by other transmitters interfere with the radio connection.

A radio channel can be tested either in real circumstances or by using a software or hardware radio channel simulator that simulates real circumstances. Tests performed in real circumstances are cumbersome, since tests performed outdoors, for example, are subject to uncontrollable phenomena, such as the weather and the time of the year, which change continuously. In addition, a test carried out in one environment (city A) is not totally valid in a second, corresponding environment (city B).

A simulator simulating a radio channel can be used very freely to simulate a radio channel. In a digital radio channel simulator, a channel is usually modelled with a FIR filter (Finite Impulse Response), which provides convolution between the channel model and an applied signal by weighting the signal, delayed by different delays, with channel coefficients, i.e. tap coefficients, and by summing the weighted signal components. A random number generator provides channel coefficients that emulate the statistical values of a real channel.

In simulation the dominant paths of a measured or generated channel are the most important. When the impulse response has a high magnitude, it is potentially a dominant path. For simulation purposes the paths are often identified by visual inspection such that high amplitude values are denoted as the dominant paths.

However, there are problems related to the channel models used in simulators. Noise in the impulse response of a channel is usually not estimated. High peaks in the impulse response estimate can be due to noise rather than a deterministic signal, but the prior art cannot distinguish between peaks of noise and peaks of a deterministic signal. Additionally, a lot of memory is usually needed for processing the paths in the impulse response estimate.

SUMMARY OF THE INVENTION

An object of the invention is to provide an improved method, apparatus, analyser, computer program distribution medium and computer program product to search for propagation paths. According to an aspect of the invention, there is provided a method of searching for propagation paths in a digital impulse response estimate of a channel relating to a radio system in order to use the paths in a radio channel estimation, the paths corresponding to the highest amplitude values in a digital impulse response estimate of a channel. The method further comprises dividing the impulse response estimate temporally into at least two subsignals; determining whether a distribution of the amplitude values of at least one subsignal is gaussian or non-gaussian; searching for at least a highest amplitude value in each subsignal, which is determined to be non-gaussian, for a radio channel to be used in a radio channel estimation.

According to another aspect of the invention, there is provided a method of forming a radio channel for a radio channel simulation, the radio channel including propagation paths from a digital impulse response estimate of a channel relating to a CDMA radio system, the paths corresponding to the highest amplitude values in a digital impulse response estimate of a channel. The method further comprises dividing the impulse response estimate temporally into at least two subsignals; determining whether a distribution of the amplitude values of at least one subsignal is gaussian or non-gaussian; searching for a highest amplitude value in each subsignal, which is determined to be non-gaussian; and forming a radio channel including each propagation path that corresponds to the highest amplitude value in each subsignal, which is determined to be non-gaussian, for a radio channel simulation.

According to another aspect of the invention, there is provided an apparatus searching for propagation paths in a digital impulse response estimate of a channel relating to a radio system in order to use the paths in a radio channel estimation, the paths corresponding to the highest amplitude values in a digital impulse response estimate of a channel. The apparatus includes a divider configured to divide the impulse response estimate temporally into at least two subsignals; an analyser configured to determine whether a distribution of the amplitude values of at least one subsignal is gaussian or non-gaussian; a searcher configured to search for a highest amplitude value in each subsignal, which is determined to be non-gaussian, for a radio channel to be used in a radio channel estimation.

According to another aspect of the invention, there is provided an apparatus of forming a radio channel for a radio channel simulation, the radio channel including propagation paths from a digital impulse response estimate of a channel relating to a CDMA radio system, the paths corresponding to the highest amplitude values in a digital impulse response estimate of a channel. The apparatus includes a divider configured to divide the impulse response estimate temporally into at least two subsignals; an analyser configured to determine whether a distribution of the amplitude values of at least one subsignal is gaussian or non-gaussian; a searcher configured to search for a highest amplitude value in each subsignal, which is determined to be non-gaussian; and a generator configured to form a radio channel for a radio channel simulation, the radio channel including each propagation path that corresponds to the highest amplitude value in each subsignal determined to be non-gaussian.

According to another aspect of the invention, there is provided an apparatus searching for propagation paths in a digital impulse response estimate of a channel relating to a radio system in order to use the paths in a radio channel estimation, the paths corresponding to the highest amplitude values in a digital impulse response estimate of a channel. The apparatus includes means for dividing the impulse response estimate temporally into at least two subsignals; means for determining whether a distribution of the amplitude values of at least one subsignal is gaussian or non-gaussian; means for searching for a highest amplitude value in each subsignal, which is determined to be non-gaussian, for a radio channel to be used in a radio channel estimation.

According to another aspect of the invention, there is provided an apparatus of forming a radio channel for a radio channel simulation, the radio channel including propagation paths from a digital impulse response estimate of a channel relating to a radio system, the paths corresponding to the highest amplitude values in a digital impulse response estimate of a channel. The apparatus includes means for dividing the impulse response estimate temporally into at least two subsignals; means for determining whether a distribution of the amplitude values of at least one subsignal is gaussian or non-gaussian; means for searching for a highest amplitude value in each subsignal, which is determined to be non-gaussian; and means for forming a radio channel for a radio channel simulation, the radio channel including each propagation path that corresponds to the highest amplitude value in each subsignal determined to be non-gaussian.

According to another aspect of the invention, there is provided an analyser for determining a degree of symmetry of a distribution of amplitude values of an impulse response estimate of a channel relating to a radio system. The analyser is configured to receive at least one subsignal which is a temporally divided section of an impulse response estimate; and determine a degree of gaussianity of a distribution of the amplitude values of at least one subsignal.

According to another aspect of the invention, there is provided a computer program product encoding a computer program of instructions for executing a computer process for searching for propagation paths in a digital impulse response estimate of a channel relating to a radio system in order to use the paths in a radio channel estimation, the paths corresponding to the highest amplitude values in a digital impulse response estimate of a channel. The process comprises: dividing the impulse response estimate temporally into at least two subsignals; determining whether a distribution of the amplitude values of at least one subsignal is gaussian or non-gaussian; searching for a highest amplitude value in each subsignal, which is determined to be non-gaussian, for a radio channel to be used in a radio channel estimation.

According to another aspect of the invention, there is provided a computer program product encoding a computer program of instructions for executing a computer process for searching for propagation paths in a digital impulse response estimate of a channel relating to a radio system in order to use the paths in a radio channel estimation, the paths corresponding to the highest amplitude values in a digital impulse response estimate of a channel. The process comprises: dividing the impulse response estimate temporally into at least two subsignals; determining whether a distribution of the amplitude values of at least one subsignal is gaussian or non-gaussian; searching for a highest amplitude value in each subsignal, which is determined to be non-gaussian; and forming a radio channel including each propagation path that corresponds to the highest amplitude value in each subsignal, which is determined to be non-gaussian, for a radio channel estimation.

According to another aspect of the invention, there is provided a computer program distribution medium readable by a computer and encoding a computer program of instructions for executing a computer process for searching for propagation paths in a digital impulse response estimate of a channel relating to a radio system in order to use the paths in a radio channel estimation, the paths corresponding to the highest amplitude values in a digital impulse response estimate of a channel. The process comprises: dividing the impulse response estimate temporally into at least two subsignals; determining whether a distribution of the amplitude values of at least one subsignal is gaussian or non-gaussian; searching for a highest amplitude value in each subsignal, which is determined to be non-gaussian, for a radio channel to be used in a radio channel estimation.

According to another aspect of the invention, there is provided a computer program distribution medium readable by a computer and encoding a computer program of instructions for executing a computer process for searching for propagation paths in a digital impulse response estimate of a channel relating to a radio system in order to use the paths in a radio channel estimation, the paths corresponding to the highest amplitude values in a digital impulse response estimate of a channel. The process comprises: dividing the impulse response estimate temporally into at least two subsignals; determining whether a distribution of the amplitude values of at least one subsignal is gaussian or non-gaussian; searching for a highest amplitude value in each subsignal, which is determined to be non-gaussian; and forming a radio channel including each propagation path that corresponds to the highest amplitude value in each subsignal, which is determined to be non-gaussian, for a radio channel estimation.

The invention provides several advantages. The paths via which the radio signal passes through the radio channel can be detected. The peaks of noise in the impulse response estimate may also effectively be distinguished from peaks of a deterministic signal. Because of the division, less memory is needed during the processing of the impulse response estimate.

BRIEF DESCRIPTION OF THE DRAWINGS

In the following, the invention will be described in greater detail with reference to the embodiments and the accompanying drawings, in which.

DETAILED DESCRIPTION OF THE PREFERRED EMBODIMENTS

The present solution is suitable for the channel simulation of a broadband radio frequency signal (RF signal). Examples of the applications include, for instance, wireless mobile communication systems such as the CDMA (Code Division Multiple Access) radio system, WCDMA (Wide-band CDMA), MC-CDMA (MultiCarrier), and UMTS (Universal Mobile Telephone System), without, however, any restriction thereto.

A WCDMA radio system, an MC-CDMA radio system, and UMTS can be considered CDMA radio systems. An MC-CDMA radio system is a combination of a CDMA technique and OFDM (Orthogonal Frequency Division Multiplexing.

Figure 1:
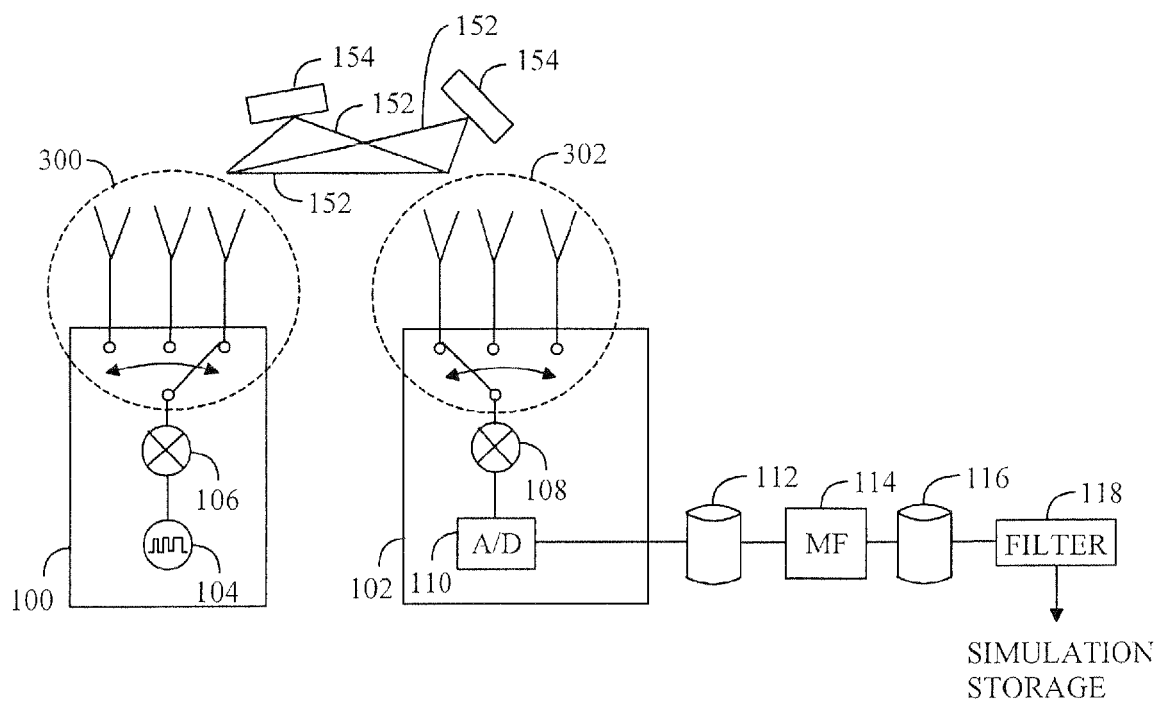
FIG. 1 shows a measurement of an impulse response estimate of a channel.

With reference to FIG. 1, examine now the basic principle of utilizing a measured radio channel in simulation. A channel sounder may measure at least one real-world radio channel in temporal and spatial domain and deliver information on the measurement to product development. The temporal domain may be estimated with one antenna, but for spatial domain a multiantenna technique is necessary. As shown in FIG. 1, a transmitter 100 can transmit a deterministic signal to a receiver 102 over an air interface. The deterministic signal can be a traffic signal, a control signal, or any other meaningful signal other than noise. This can take place indoors or outdoors. The deterministic signal may propagate through several paths 152 because of reflection or diffraction caused by objects 154. When a transmitted signal is known or available, it is possible to produce a characterizing temporal series of estimates of the radio channel between the transmitter 100 and the receiver 102 by comparing the transmitted signal and the received signal. The channel measurement can be based, for example, on a spread-spectrum sounding method.

The transmitter 100 may include a signal generator 104 which can be a periodic pseudorandom sequence generator for providing at least one desired deterministic signal. The deterministic signal may be a CDMA signal, WCDMA signal or MC-CDMA signal. The signal can then be up-converted to a radio frequency signal in a mixer 106 before transmitting the deterministic signal through the antenna 300.

The receiver 102 down-converts the signal received by the antenna 302 in a mixer 108. The down-converted signal can then be transformed into digital form in an A/D converter 110. The digital samples of the received signal can be stored in a storage 112, which can be a mass storage memory such as a hard disc or storage tape, although the present solution has no special restriction with respect to the type of memory. However, the measurement can result in up to tens of gigabits or even more. During the measurement the received signal can be sampled regularly and continuously. Delay resolution of the measurement data can be matched to the needs.

The antenna 300 of the transmitter 100 and the antenna 302 of the receiver 102 may consist of a single antenna element or an array of antenna elements such that at least one measurement of SISO (Single Input Single Output), SIMO (Single Input Multiple Output), MISO (Multiple Input Single Output) or MIMO (Multiple Input Multiple Output) channel is possible.

From the storage 112 or directly from the receiver 102, the received signal can proceed to a matched filter 114 or the like in order to form a sequence of impulse response estimates of the measured channel. The temporal sequences represent the behaviour of the channel during the measurement period, and one temporal sequence of impulse response estimates represents one radio channel. The radio channel can be recorded at a constant rate such that the impulse response estimates are formed uniformly as a function of time. Additionally or alternatively, the received signal impulse response estimates can be stored in a storage 116 which may be similar to the storage 112.

An apparatus such as a statistical filter 118 searches for (dominant) propagation paths in the impulse response estimate. The statistical filter 118 may also change the sampling of the impulse response estimates and the format of the impulse response estimates. Often the rate of impulse response estimates is increased by interpolation for simulation purposes. The data interpolation factor can have any desired value.

The measured data may contain a high number of plane wave propagation radio channel paths. This is particularly true in urban environments whereas in rural environments with open fields, the number of paths is typically low. The statistical filter 118 may decrease the high number of paths, since the radio channel simulator usually has a certain limit for the maximum number of processable paths. This can be achieved by removing a suitable number of dominant paths having the lowest values.

Instead of measuring the impulse response estimate of a channel, it is possible to artificially generate the impulse response estimate. The measured or generated impulse response estimate is filtered in the statistical filter 118 in a similar manner.

Figure 2:
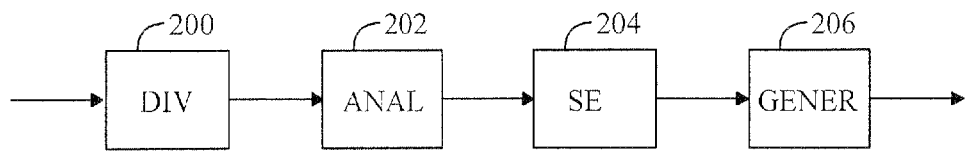
FIG. 2 illustrates a statistical filter.

FIG. 2 illustrates the statistical filter 118 which searches for propagation paths in a digital impulse response estimate of a channel relating to a CDMA radio system in order to use the paths in a radio channel simulation. The paths correspond to the highest amplitude values in a digital impulse response estimate of a channel. An impulse response estimate may be pure noise without a path, or an impulse response estimate may include one path or many paths. In the case of a path, the sample having the maximum value is probably the path. In the case of many paths, the samples having higher values than the other samples probably represent the paths.

The statistical filter 118 includes a divider 200 for dividing the impulse response estimate temporally into at least two subsignals. The subsignals can have the same duration or different durations. The duration may usually be from tens of nanoseconds to several hundreds of nanoseconds. A statistical analyser 202, in turn, may determine whether a distribution of the amplitude values of at least one subsignal is gaussian or non-gaussian. Whether the subsignal is gaussian or non-gaussian may be determined by analysing whether the distribution of the amplitude values of the subsignal is symmetric or non-symmetric because a gaussian distribution is symmetric and a non-gaussian distribution is often non-symmetric. Especially, if a gaussian distribution is assumed, as is usually the case in telecommunication technology, an evaluation based on symmetry or non-symmetry may be possible.

If the distribution of the samples of a subsignal is non-gaussian, the distribution can be considered deformed by a deterministic signal, i.e. the sub-signal is not pure noise but also includes at least traces of a deterministic signal. The subsignals determined to be gaussian can be discarded, since they can be considered noise. Thus, a searcher 204 may search for at least one sample having a higher amplitude value than the rest of the samples in each subsignal, determined to be non-gaussian. A channel generator 206 forms a radio channel including each propagation path that corresponds to the highest amplitude value in each subsignal determined to be non-gaussian for the radio channel simulation. The channel generator 206 may remove samples which do not belong to any path. The removed samples may be replaced by desired values, such as constant values, variable values defined by a deterministic function, or values of noise.

The statistical analyser 202 may measure a degree of gaussianity of the distribution of the amplitude values of at least one subsignal and determine that the distribution is non-gaussian, if the degree of gaussianity is below a predetermined threshold. Hence, it can be considered at least in many practical cases that the statistical analyser 202 measures a degree of symmetry of the distribution of the amplitude values relating to each subsignal and determines that the distribution is non-gaussian (i.e. non-symmetric), if the degree is below a predetermined threshold. The degree can be measured, for example, in a scale from 0 to 1, where 0 means that the distribution is non-gaussian and 1 means that the distribution is perfectly gaussian. The predetermined threshold can be, for instance, 0.5 or any other desired value between 0.5 and 1.

In general, if the distribution (i.e. density function) of samples which form a scalar random variable is symmetric about its mean, the samples can be considered noise and the mean and the median are (about) the same. This is true, for example, for a gaussian distribution. If the distribution of samples is non-gaussian, the distribution can be considered deformed by a deterministic signal. A mean $m_x$ may be formed, for example, as an expected value $E\{x\}$ $$m_x = E\{x\} = \frac{1}{N}\sum_{i=1}^{N} x_i, \quad (1)$$

where x is a subsignal (in vector form) having values $x_1; \ldots, x_n$; $x_i$ represents a value of the $i^{th}$ sample in the subsignal x; and N is the total number of samples in the subsignal.

A median md can be formed, for instance, as $md_x = x_k$ in which case $P(x \leq x_k) = 0.5$, where $P(x \leq x_k)$ means the probability that any value x in a vector x is less or equal to $x_k$. The probability can be expressed, for example, as $$P(x \leq x_k) = N_k/N, \quad (2)$$

where $N_k$ means the number of the samples of the subsignal for which $x \leq x_k$, and N means the total number of the samples in the subsignal.

Hence, the statistical analyser 202 may form a median of the amplitude values of at least one subsignal and the statistical analyser may form a mean of the amplitude values of the at least one corresponding subsignal. The statistical analyser 202 may determine that the distribution of each subsignal is non-gaussian if the median and the mean of a subsignal differ from each other more than a reference difference. The reference difference may be, for example, 3 dB.

The statistical analyser 202 may form a mode of the amplitude values of at least one subsignal, and the statistical analyser may form a mean (or median) of the amplitude values of the at least one corresponding subsignal. A mode is the most likely value, and it is the sample for which the probability is the highest. In general, if the distribution of samples which form a scalar random variable is gaussian about its mean and the distribution is unimodal (i.e. it has only one mode), the samples can be considered noise and the mean and the mode are (about) the same. This is true, for example, for a gaussian distribution. Hence, the statistical analyser 302 may determine that the distribution non-gaussian, if the mode and the mean of the same subsignal differ from each other more than a reference difference. That can be accomplished by a hard limiter. Instead of the mean, the median and the mode can be compared to determine whether the distribution is gaussian or non-gaussian, because the mean and the median can be considered to correspond each other.

Instead of searching for one maximum value, the searcher 204 may additionally search for at least one amplitude value which has a lower value than the highest amplitude value in each subsignal, which is determined to be non-gaussian. A group of samples with amplitudes having higher values than the samples having the lowest amplitude values is of interest. The group may include at least two amplitude values.

Figure 3:
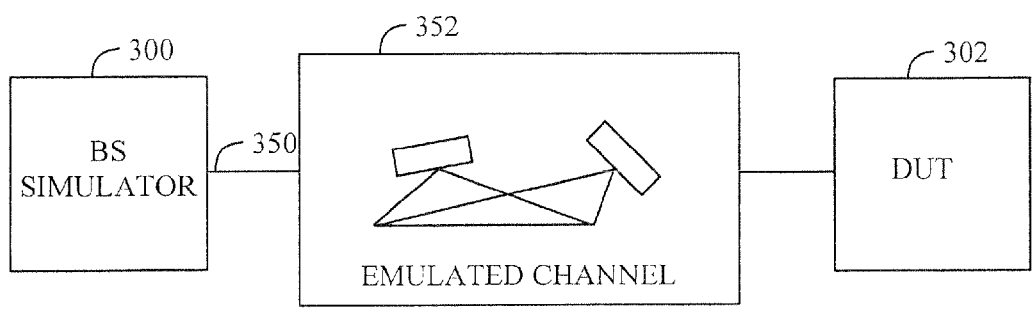
FIG. 3 illustrates a channel simulation.

FIG. 3 illustrates the use of the temporal series of the estimates of the radio channel in a simulated air interface of a simulation. A transmitter 300 can transmit a deterministic signal 350 to a receiver 302 through the simulated air interface 352, which may correspond to an artificially generated radio channel or the measured radio channel in FIG. 1. Particularly in the case of a measured channel, the solution enables repeated use of realistic channels, or a certain part of any measured channel can be replayed over and over again, if necessary.

Figure 4:
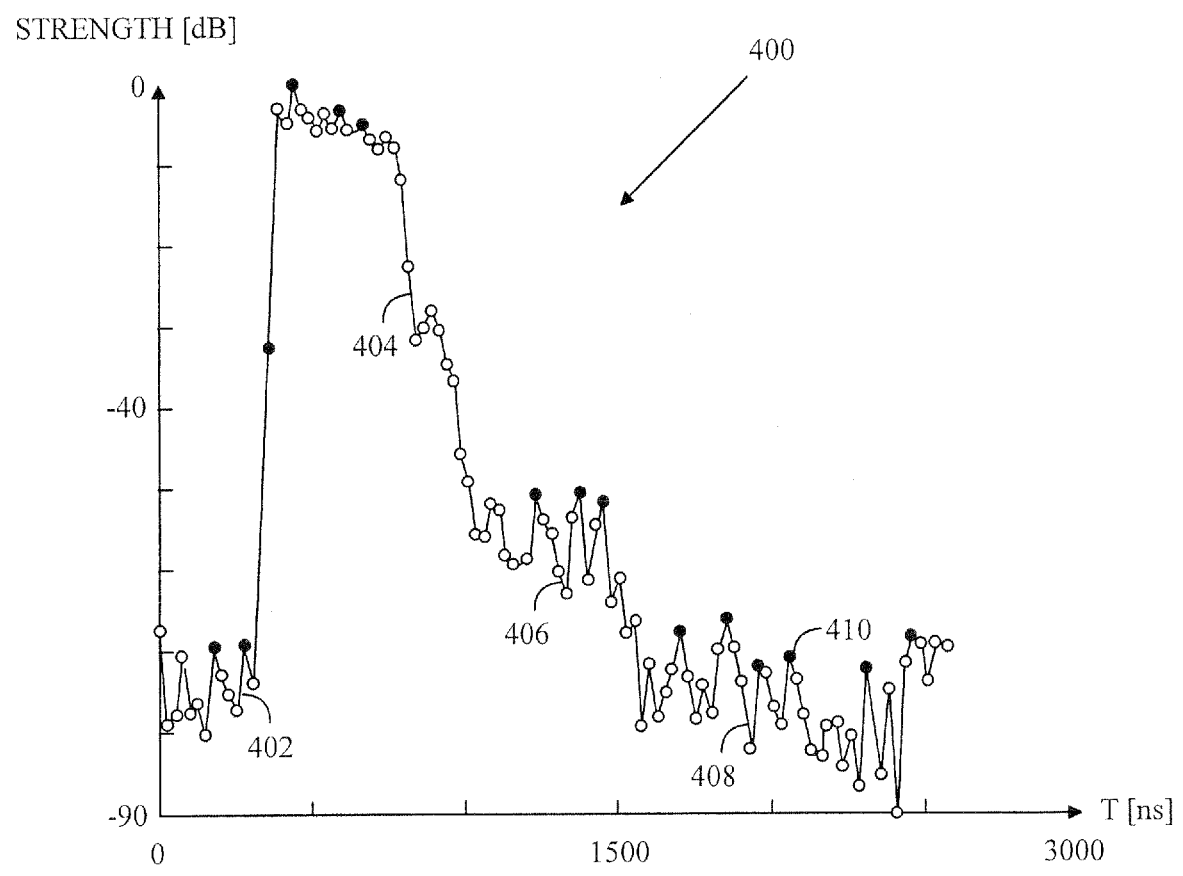
FIG. 4 illustrates an impulse response estimate.

FIG. 4 shows an analysed impulse response estimate 400. The paths found in the search are marked with black dots while the other paths are discarded. In this example the searcher has searched for three paths in each subsignal 402 to 410 of 500 ns, which are 0 to 500 ns, 500 ns to 1000 ns, 1000 ns to 1500 ns, 1500 ns to 2000 ns, and 200 ns to 2500 ns.

Figure 5:
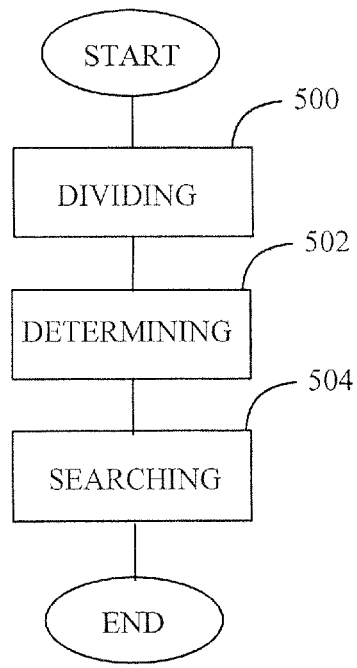
FIG. 5 illustrates a flow chart of the method.

FIG. 5 shows a flow chart of the method. In step 500 the impulse response estimate is divided temporally into at least two subsignals. In step 502 a distribution of the amplitude values of at least one subsignal is determined to be gaussian or non-gaussian. In step 504 at least the highest amplitude value in each subsignal, which is determined non-gaussian, is searched for. The paths corresponding to the one or more highest amplitude values are used in simulation.

Figure 6:
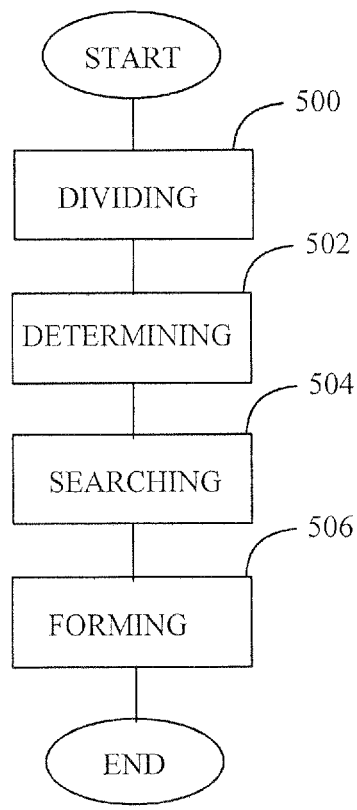
FIG. 6 illustrates a flow chart of the method.

FIG. 6 is similar to FIG. 5 except that there is an additional step 506. In step 500 the impulse response estimate is divided temporally into at least two subsignals. In step 502 a distribution of the amplitude values of at least one subsignal is determined to be gaussian or non-gaussian. In step 504 at least the highest amplitude value in each subsignal, which is determined non-gaussian, is searched for. In step 506 a radio channel including each propagation path corresponding to the highest amplitude value in each subsignal determined to be non-gaussian is formed for the radio channel simulation.

The implementation can be accomplished, for example, by means of specific equipment providing the required operations, such as an application-specific integrated circuit (ASIC), or separate logic components. The implementation may also be accomplished, for example, by means of software, the statistic filter comprising enough memory, and a microprocessor, where the operations of the method described above are carried out in the form of software.

In a case of a software solution, a computer program product may encode a computer program of instructions for executing a computer process for searching for propagation paths in a digital impulse response estimate of a channel relating to a CDMA radio system in order to use the paths in a radio channel simulation, the paths corresponding to the highest amplitude values in a digital impulse response estimate of a channel.

A computer program can be distributed in a distribution medium readable by a computer. A computer program of instructions can be encoded for executing the computer process for searching for propagation paths in a digital impulse response estimate of a channel relating to a CDMA radio system in order to use the paths in a radio channel simulation, the paths corresponding to the highest amplitude values in a digital impulse response estimate of a channel.

The distribution medium may comprise a computer readable medium, a program storage medium, a record medium, a computer readable memory, a computer readable software distribution package, a computer readable signal, a computer readable telecommunications signal, or a computer readable compressed software package.

Even though the invention is described above with reference to an example according to the accompanying drawings, it is clear that the invention is not restricted thereto but it can be modified in several ways within the scope of the appended claims.

What is claimed is:

1. A method of searching for propagation paths in a digital impulse response estimate of a channel relating to a radio system in order to use the paths in a radio channel estimation, the paths corresponding to the highest amplitude values in the digital impulse response estimate of the channel, the method comprising:

dividing, by a processing device, the impulse response estimate temporally into at least two subsignals that occupy different predetermined periods of time;

determining, by the processing device, whether a distribution of the amplitude values of at least one subsignal is gaussian or non-gaussian using a degree of symmetry associated with the distribution of the amplitude values; and searching, by the processing device, for at least a highest amplitude value in each sub-signal, which is determined to be non-gaussian, to form a radio channel to be used in the radio channel estimation, the radio channel including each propagation path that corresponds to the highest amplitude value in each subsignal determined to be non-gaussian.

2. A method of forming a radio channel for a radio channel simulation, the radio channel including propagation paths from a digital impulse response estimate of a channel relating to a CDMA radio system, the paths corresponding to the highest amplitude values in the digital impulse response estimate of the channel, the method comprising:

dividing, by a processing device, the impulse response estimate temporally into at least two subsignals that occupy different predetermined periods of time;

determining, by the processing device, whether a distribution of the amplitude values of at least one subsignal is gaussian or non-gaussian using a degree of symmetry associated with the distribution of the amplitude values;

searching, by the processing device, for a highest amplitude value in each subsignal, which is determined to be non-gaussian; and forming, by the processing device, a radio channel including each propagation path that corresponds to the highest amplitude value in each subsignal, which is determined to be non-gaussian, for a radio channel simulation.

3. The method of claim 1, further comprising:
measuring a degree of gaussianity of the distribution of the amplitude values of at least one subsignal; and
determining the distribution to be non-gaussian, if the degree of gaussianity is below a predetermined threshold.

4. The method of claim 1, further comprising:
forming a median of the amplitude values of at least one subsignal;
forming a mean of the amplitude values of at least one subsignal; and
determining the distribution to be non-gaussian, if the median and the mean differ from each other more than a reference difference.

5. The method of claim 1, further comprising:
forming a mode of the amplitude values of at least one subsignal;
forming a mean of the amplitude values of at least one subsignal; and
determining the distribution to be non-gaussian, if the mode and the mean differ from each other more than a reference difference.

6. The method of claim 1, further comprising:
forming a mode of the amplitude values of at least one subsignal;
forming a median of the amplitude values of at least one subsignal; and
determining the distribution to be non-gaussian, if the mode and the median differ from each other more than a reference difference.

7. The method of claim 1, further comprising searching additionally for at least one amplitude value which has a lower value than the highest amplitude value in each subsignal determined to be non-gaussian.

8. An apparatus for searching for propagation paths in a digital impulse response estimate of a channel relating to a radio system in order to use the paths in a radio channel estimation, the paths corresponding to the highest amplitude values in the digital impulse response estimate of the channel, the apparatus comprising:

a divider configured to divide the impulse response estimate temporally into at least two subsignals that occupy different predetermined periods of time;

an analyser configured to determine whether a distribution of the amplitude values of at least one subsignal is gaussian or non-gaussian using a degree of symmetry associated with the distribution of the amplitude values; and a searcher configured to search for a highest amplitude value in each subsignal, which is determined to be non-gaussian, to form a radio channel to be used in the radio channel estimation, the radio channel including each propagation path that corresponds to the highest amplitude value in each subsignal determined to be non-gaussian.

9. An apparatus for forming a radio channel for a radio channel simulation, the radio channel including propagation paths from a digital impulse response estimate of a channel relating to a CDMA radio system, the paths corresponding to the highest amplitude values in the digital impulse response estimate of the channel, the apparatus comprising:

a divider configured to divide the impulse response estimate temporally into at least two subsignals that occupy different predetermined periods of time;

an analyser configured to determine whether a distribution of the amplitude values of at least one subsignal is gaussian or non-gaussian using a degree of symmetry associated with the distribution of the amplitude values;

a searcher configured to search for a highest amplitude value in each subsignal, which is determined to be non-gaussian; and a generator configured to form a radio channel for a radio channel simulation, the radio channel including each propagation path that corresponds to the highest amplitude value in each subsignal determined to be non-gaussian.

10. The apparatus of claim 8, wherein the analyser is configured to
measure a degree of gaussianity of the distribution of the amplitude values of at least one subsignal; and
determine the distribution to be non-gaussian, if the degree of symmetry is below a predetermined threshold.

11. The apparatus of claim 8, wherein the analyser is configured to
form a median of the amplitude values of at least one subsignal;
form a mean of the amplitude values of at least one subsignal; and
determine the distribution to be non-gaussian, if the median and the mean differ from each other more than a reference difference.

12. The apparatus of claim 8, wherein the analyser is configured to
form a mode of the amplitude values of at least one subsignal;
form a mean of the amplitude values of at least one subsignal; and
determine the distribution to be non-gaussian, if the mode and the mean differ from each other more than a reference difference.

13. The apparatus of claim 8, wherein the searcher is configured to additionally search for at least one amplitude value which has a lower value than the highest value in each subsignal determined to be non-gaussian.

14. An apparatus for searching for propagation paths in a digital impulse response estimate of a channel relating to a radio system in order to use the paths in a radio channel estimation, the paths corresponding to the highest amplitude values in the digital impulse response estimate of the channel, the apparatus comprising:

means for dividing the impulse response estimate temporally into at least two subsignals that occupy different predetermined periods of time;
  means for determining whether a distribution of the amplitude values of at least one subsignal is gaussian or non-gaussian using a degree of symmetry associated with the distribution of the amplitude values; and
  means for searching for a highest amplitude value in each subsignal, which is determined to be non-gaussian, to form a radio channel to be used in the radio channel estimation, the radio channel including each propagation path that corresponds to the highest amplitude value in each subsignal determined to be non-gaussian.

15. An apparatus for forming a radio channel for a radio channel simulation, the radio channel including propagation paths from a digital impulse response estimate of a channel relating to a radio system, the paths corresponding to the highest amplitude values in the digital impulse response estimate of the channel, the apparatus comprising:

means for dividing the impulse response estimate temporally into at least two subsignals that occupy different predetermined periods of time;
  means for determining whether a distribution of the amplitude values of at least one subsignal is gaussian or non-gaussian using a degree of symmetry associated with the distribution of the amplitude values;
  means for searching for a highest amplitude value in each subsignal, which is determined to be non-gaussian; and
  means for forming a radio channel for a radio channel simulation, the radio channel including each propagation path that corresponds to the highest amplitude value in each subsignal determined to be non-gaussian.

16. An analyser for determining a degree of symmetry of a distribution of amplitude values of an impulse response estimate of a channel relating to a radio system, wherein the analyser is configured to receive at least one subsignal which is a temporally divided section of the impulse response estimate that occupy different predetermined periods of time; and
  determine a degree of gaussianity of the distribution of the amplitude values of at least one subsignal using a degree of symmetry associated with the distribution of the amplitude values.

17. A computer program product stored in a non-transitory computer-readable medium, the computer program product including a computer program of instructions that, when executed by a processing device, perform a computer process that searches for propagation paths in a digital impulse response estimate of a channel relating to a radio system in order to use the paths in a radio channel estimation, the paths corresponding to the highest amplitude values in the digital impulse response estimate of the channel, the computer process comprising:

dividing the impulse response estimate temporally into at least two subsignals that occupy different predetermined periods of time;
  determining whether a distribution of the amplitude values of at least one subsignal is gaussian or non-gaussian using a degree of symmetry associated with the distribution of the amplitude values;
  searching for a highest amplitude value in each subsignal, which is determined to be non-gaussian, to form a radio channel to be used in the radio channel estimation, the radio channel including each propagation path that corresponds to the highest amplitude value in each subsignal determined to be non-gaussian.

18. A computer program product stored in a non-transitory computer-readable medium, the computer program product including a computer program of instructions that, when executed by a processing device, perform a computer process that searches for propagation paths in a digital impulse response estimate of a channel relating to a radio system in order to use the paths in a radio channel estimation, the paths corresponding to the highest amplitude values in the digital impulse response estimate of the channel, the process comprising:

dividing the impulse response estimate temporally into at least two subsignals that occupy different predetermined periods of time;
  determining whether a distribution of the amplitude values of at least one subsignal is gaussian or non-gaussian using a degree of symmetry associated with the distribution of the amplitude values;
  searching for a highest amplitude value in each subsignal, which is determined to be non-gaussian; and
  forming a radio channel including each propagation path that corresponds to the highest amplitude value in each subsignal, which is determined to be non-gaussian, for the radio channel estimation.

19. A non-transitory computer program distribution medium readable by a computer, the non-transitory computer program distribution medium including a computer program of instructions for executing a computer process for searching for propagation paths in a digital impulse response estimate of a channel relating to a radio system in order to use the paths in a radio channel estimation, the paths corresponding to the highest amplitude values in a digital impulse response estimate of a channel, the computer process comprising:

dividing the impulse response estimate temporally into at least two subsignals that occupy different predetermined periods of time;
  determining whether a distribution of the amplitude values of at least one subsignal is gaussian or non-gaussian using a degree of symmetry associated with the distribution of the amplitude values; and
  searching for a highest amplitude value in each subsignal, which is determined to be non-gaussian, to form a radio channel to be used in the radio channel estimation, the radio channel including each propagation path that corresponds to the highest amplitude value in each subsignal determined to be non-gaussian.

20. A non-transitory computer program distribution medium readable by a computer, the non-transitory computer program distribution medium including a computer program of instructions for executing a computer process for searching for propagation paths in a digital impulse response estimate of a channel relating to a radio system in order to use the paths in a radio channel estimation, the paths corresponding to the highest amplitude values in a digital impulse response estimate of a channel, the computer process comprising:

dividing the impulse response estimate temporally into at least two subsignals that occupy different predetermined periods of time;
  determining whether a distribution of the amplitude values of at least one subsignal is gaussian or non-gaussian using a degree of symmetry associated with the distribution of the amplitude values;

searching for a highest amplitude value in each sub signal, which is determined to be non-gaussian; and forming a radio channel including each propagation path that corresponds to the highest amplitude value in each subsignal, which is determined to be non-gaussian, for the radio channel estimation.

21. The non-transitory computer program distribution medium of claim 19, wherein the distribution medium comprises a computer readable medium, a program storage medium, a record medium, a computer readable memory, a computer readable software distribution package, or a computer readable compressed software package.

22. The method of claim 2, further comprising:
measuring a degree of gaussianity of the distribution of the amplitude values of at least one subsignal; and
determining the distribution to be non-gaussian, if the degree of gaussianity is below a predetermined threshold.

23. The method of claim 2, further comprising:
forming a median of the amplitude values of at least one subsignal;
forming a mean of the amplitude values of at least one subsignal; and
determining the distribution to be non-gaussian, if the median and the mean differ from each other more than a reference difference.

24. The method of claim 2, further comprising:
forming a mode of the amplitude values of at least one subsignal;
forming a mean of the amplitude values of at least one subsignal; and
determining the distribution to be non-gaussian, if the mode and the mean differ from each other more than a reference difference.

25. The method of claim 2, further comprising:
forming a mode of the amplitude values of at least one subsignal;
forming a median of the amplitude values of at least one subsignal; and
determining the distribution to be non-gaussian, if the mode and the median differ from each other more than a reference difference.

26. The method of claim 2, further comprising searching additionally for at least one amplitude value which has a lower value than the highest amplitude value in each subsignal determined to be non-gaussian.

27. The apparatus of claim 9, wherein the analyser is configured to
measure a degree of gaussianity of the distribution of the amplitude values of at least one subsignal; and
determine the distribution to be non-gaussian, if the degree of symmetry is below a predetermined threshold.

28. The apparatus of claim 9, wherein the analyser is configured to
form a median of the amplitude values of at least one subsignal;
form a mean of the amplitude values of at least one subsignal; and
determine the distribution to be non-gaussian, if the median and the mean differ from each other more than a reference difference.

29. The apparatus of claim 9, wherein the analyser is configured to
form a mode of the amplitude values of at least one subsignal;
form a mean of the amplitude values of at least one subsignal; and
determine the distribution to be non-gaussian, if the mode and the mean differ from each other more than a reference difference.

30. The apparatus of claim 9, wherein the searcher is configured to additionally search for at least one amplitude value which has a lower value than the highest value in each subsignal determined to be non-gaussian.

31. The non-transitory computer program distribution medium of claim 20, wherein the distribution medium comprises a computer readable medium, a program storage medium, a record medium, a computer readable memory, a computer readable software distribution package, or a computer readable compressed software package.

* * * * *

UNITED STATES PATENT AND TRADEMARK OFFICE
CERTIFICATE OF CORRECTION

| | |
|---|---|
| PATENT NO. | : 8,605,688 B2 |
| APPLICATION NO. | : 12/097956 |
| DATED | : December 10, 2013 |
| INVENTOR(S) | : Nuutinen et al. |

It is certified that error appears in the above-identified patent and that said Letters Patent is hereby corrected as shown below:

In the Specification

Column 8, line 3:

Now reads:   "200 ns";
Should read:   -- 2000 ns --.

Signed and Sealed this
Twenty-second Day of July, 2014

Michelle K. Lee
*Deputy Director of the United States Patent and Trademark Office*